United States Patent
Bouyonnet

(10) Patent No.: US 6,712,179 B2
(45) Date of Patent: Mar. 30, 2004

(54) SEALING AND ACOUSTIC INSULATION PANEL, IN PARTICULAR FOR AUTOMOBILE DOORS

(75) Inventor: Vincent Bouyonnet, Les Essarts le Roi (FR)

(73) Assignee: Sofitec SA, Buc (FR)

( * ) Notice: Subject to any disclaimer, the term of this patent is extended or adjusted under 35 U.S.C. 154(b) by 0 days.

(21) Appl. No.: 09/873,435

(22) Filed: Jun. 5, 2001

(65) Prior Publication Data

US 2002/0170776 A1 Nov. 21, 2002

(30) Foreign Application Priority Data

May 15, 2001 (FR) .............................. 01 06681

(51) Int. Cl.[7] .............................................. E04B 9/22
(52) U.S. Cl. ...................................... 181/290; 181/284
(58) Field of Search ................................ 181/290, 295, 181/199; 49/502; 264/46, 46.1–46.4

(56) References Cited

U.S. PATENT DOCUMENTS

| 4,924,969 | A | * | 5/1990 | L'Heureux | ................. 181/290 |
| 5,298,694 | A | | 3/1994 | Thompson et al. | |
| 5,473,125 | A | | 12/1995 | Stief et al. | |
| 6,102,465 | A | * | 8/2000 | Nemoto et al. | ............. 296/39.3 |
| 6,210,613 | B1 | * | 4/2001 | Stein et al. | ................. 264/45.4 |
| 6,393,767 | B1 | * | 5/2002 | Fukumoto et al. | ............. 49/503 |
| 6,397,525 | B1 | * | 6/2002 | Ishibashi et al. | ........... 49/475.1 |
| 6,412,852 | B1 | * | 7/2002 | Koa et al. | ................. 296/146.7 |

* cited by examiner

*Primary Examiner*—Robert E. Nappi
*Assistant Examiner*—David S. Warren
(74) *Attorney, Agent, or Firm*—Lawrence E. Laubscher, Sr.

(57) ABSTRACT

A sealing and acoustic insulation panel, in particular for automobile vehicle doors, includes a sealing sheet and a layer of acoustic insulation, with a bead of adhesive material on the sealing sheet for fixing the panel to a support plate. A frame for applying pressure to the bead of adhesive material is placed between the sealing and acoustic insulation panel and a trim panel clipped to the support plate.

10 Claims, 1 Drawing Sheet

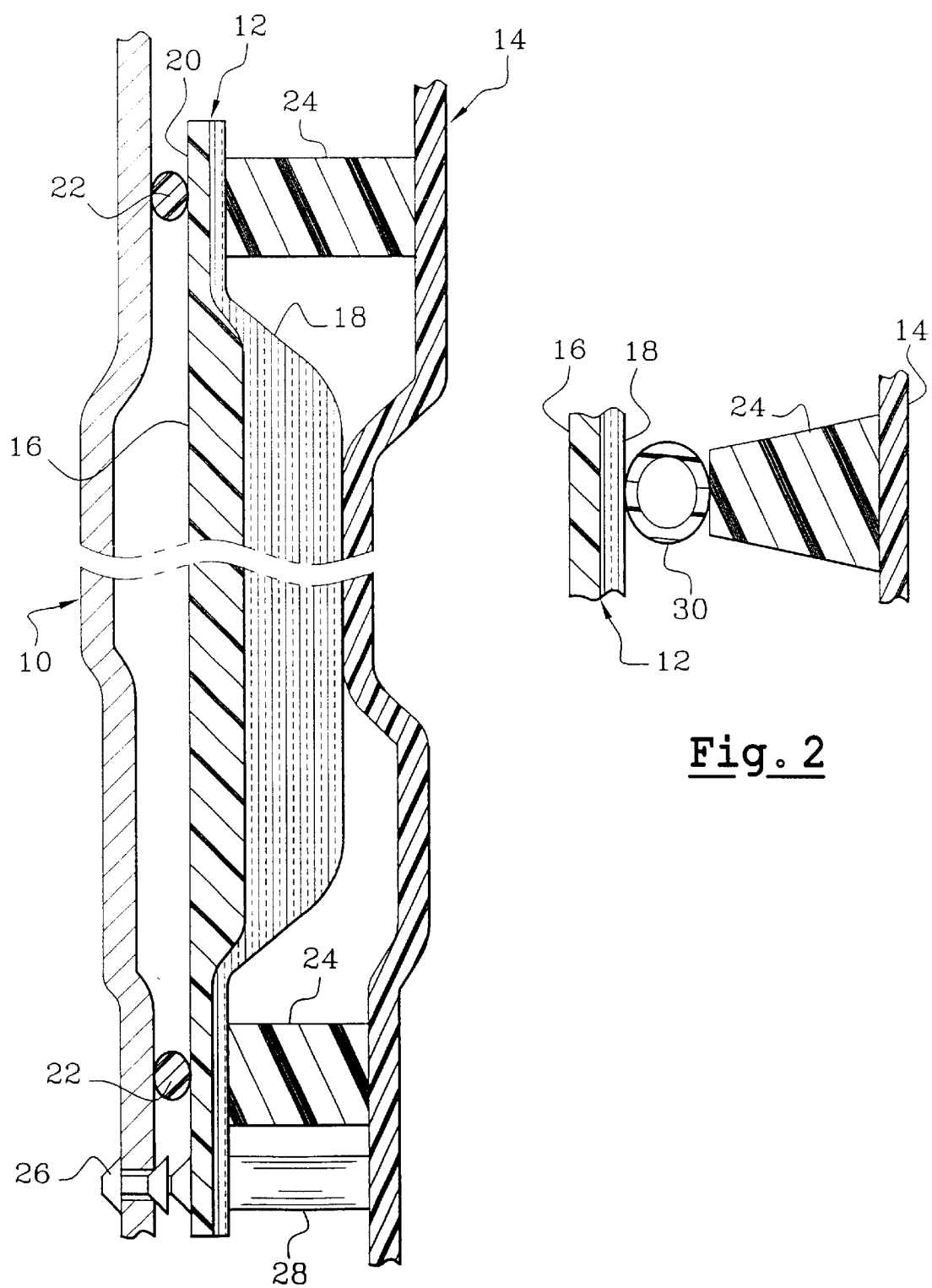

SEALING AND ACOUSTIC INSULATION PANEL, IN PARTICULAR FOR AUTOMOBILE DOORS

BACKGROUND OF THE INVENTION

1—Field of the Invention

The present invention relates to a sealing and acoustic insulation panel, in particular for automobile vehicle doors, the panel including a synthetic plastic material sealing sheet and a layer of acoustic insulation, generally of a fibrous material, for example, wadding consisting of fine tangled fibers of synthetic plastic material.

2—Description of the Prior Art

In the prior art, a panel of this type is glued to a support plate such as the inner metal skin of a door by means of a bead of glue deposited on the free face of the sealing sheet and protected by a silicone-coated or similar paper strip. When the panel is used, the protective paper strip is removed, the panel is applied to the support plate at the required location, and a roller is passed over the free face of the panel, i.e. over the layer of acoustic insulation, over the strip of glue, to press it down well and therefore to glue the panel properly to the support panel.

An embellisher panel, such as a door trim panel, is then fixed, for example clipped, to the support, with the sealing panel between the support plate and the trim panel.

The above prior art technique has drawbacks for automobile manufacturers, as they have to obtain separate supplies of the sealing and acoustic insulation panels and the door trim panels, their stock control procedures have to cover two stocks of panels, and at assembly time the sealing and acoustic insulation panel must first be fixed to the support plate, after which the roller is applied to the required place on the panel, as already indicated, after which the trim panel is clipped to the support plate.

It has been proposed to simplify and reduce the cost of this assembly procedure firstly by supplying a one-piece assembly comprising the sealing and acoustic insulation panel already in position on the trim panel, which one-piece assembly is fixed to the support plate in one operation. As in the prior art, a bead of glue has been deposited onto the free face of the sealing sheet to glue the sealing and acoustic insulation panel to the support plate, and it is the elasticity of that panel when compressed between the support plate and the trim panel that is deemed to press the bead of glue sufficiently strongly onto the support plate.

Serious gluing defects are encountered in practice, however, due to insufficient elasticity of the layer of acoustic insulation, which has only a very low resistance to compression when it is made from fibers that have a very small diameter, in order to have a good acoustic insulation capacity, and which still has too low a resistance to compression even when it is formed of larger diameter fibers, to increase its elasticity, although this is to the detriment of its acoustic insulation capacity.

One particular object of the present invention is to provide a simple, effective and low-cost solution to the above problem.

OBJECT OF THE INVENTION

The invention proposes a sealing and acoustic insulation panel, in particular for automobile vehicle doors, said panel including a synthetic plastic material sealing sheet and a layer of acoustic insulation, for example, a layer of fibrous material, wherein said panel is associated with a semi-rigid synthetic plastic material bearing frame that extends over a free face of said layer of acoustic insulation in line with a bead of adhesive material deposited on a free face of said sealing sheet for fixing said panel to a support plate such as a door inner skin.

The bearing frame, which extends along the bead of adhesive material on the other side of the sealing and acoustic insulation panel enables pressure to be applied effectively to the bead of adhesive when an embellisher panel, such as a door trim panel, is fixed to the support plate by appropriate means, the bearing frame being disposed between the sealing and acoustic insulation panel and the trim panel and bearing on the trim panel.

In a particular embodiment of the invention, the frame is made from an expanded synthetic plastic material, for example, in expanded polypropylene, and preferably in expanded polypropylene balls and is shaped by molding.

The polypropylene balls are preferably expanded and bonded together in the mold in which the bearing frame is made.

According to another feature of the invention, the sealing and acoustic insulation panel, the frame and the embellisher panel form a sub-assembly which is mounted on said support in a single operation.

The trim panel is clipped or screwed to said support at the same time as said sealing and acoustic insulation panel is glued to said support.

Generally speaking, the invention simplifies the operations that must be effected on an assembly line, in particular an automobile vehicle door assembly line, reduces the number of such operations, and reduces the assembly, procurement and storage costs incurred by automobile manufacturers.

The invention will be better understood and other features, details and advantages of the invention will become more clearly apparent after reading the following description, which is given by way of example and with reference to the accompanying drawings.

BRIEF DESCRIPTION OF THE DRAWINGS

FIG. 1 is a partial diagrammatic sectional view of a panel according to the invention.

FIG. 2 is a partial diagrammatic sectional view of a different embodiment.

DESCRIPTION OF THE PREFERRED EMBODIMENTS

FIG. 1 shows a support plate 10, in particular a door inner skin, to the inside face of which, i.e. the face that faces toward the inside of the vehicle, are fixed a sealing and acoustic insulation panel 12 and a door trim panel 14, the latter of which is made of plastics material, for example, and can include accessories such as an armrest, an ashtray, etc.

The sealing and acoustic insulation panel 12 can be made in many different ways and the example shown includes a thermoformed sealing sheet 16 which has on its inside face, i.e. on the face that faces toward the inside of the vehicle, a layer 18 of acoustic and possibly thermal insulation. The sealing sheet 16 is made of polyolefin foam, for example, such as cross-linked polyethylene or polypropylene foam, and its thickness can be in the range from about 1 millimeter to about 3 millimeters. The acoustic insulation layer 18 consists of wadding made up of fine tangled fibers, preferably polyester fibers, and has a thickness in the range from about 8 millimeters to about 30 millimeters. The fibers have a diameter of the order of 10 μm or less, for example.

As shown here, the peripheral area 20 of the panel can be thinner over at least part of its circumference, the reduction in thickness being obtained by thermoforming the sealing sheet 16 to form a strip for gluing it to the support 10 by means of a bead 22 of adhesive material that is deposited on the free face of the sheet 16. The width of the peripheral area 20 is from about 30 millimeters to about 40 millimeters, for example. Its thickness varies as a function of the original thickness of the sealing sheet 16.

For correct gluing of the panel 12 to the support plate 10, a bearing frame 24 is disposed between the panels 12 and 14 and extends in line with the bead 22 of adhesive material, on the opposite side of the panel 12. The frame 24 bears on the free face of the layer 18 of acoustic insulation and on the outside face of the trim panel 14 over the whole of the periphery of the frame, its height at every point being determined substantially as a function of the distance between the panels 12 and 14 at the location of the bead 22 of adhesive material. The frame 24 therefore forms a substantially continuous spacer between the panels 12 and 14 along the bead 22 of adhesive material and compresses the layer 18 of acoustic insulation.

In a preferred embodiment, the frame 24 is made from an expanded synthetic plastic material, for example, from expanded polypropylene balls, and has some elasticity. It is molded by feeding non-expanded polystyrene balls into a molding chamber that has the same shape as the frame 24 and then heating the polystyrene balls to expand them and bond them together. The resulting frame 24 is very light and sufficiently rigid to transmit an appropriate bearing force to the peripheral area 20 of the panel 12 in line with the bead 22 of adhesive material. It is also elastically deformable to a sufficient degree to absorb the dimensional tolerances of the support 10 and the panels 12, 14.

The panel 14 is clipped to the support plate 10 by means of "Christmas tree" pins 26 carried by studs 28 on the panel 14. The Christmas tree pins 26 can advantageously also hold the panel 12 onto the panel 14, before the combination is fixed to the support plate 10.

The panel 14 can instead be screwed to the support plate 10.

The bearing frame 24 is, of course, disposed between the panels 12 and 14 at locations where its presence is useful. In the prior art, blocks of expanded synthetic plastic material, for example, expanded polystyrene, have been placed between the panels 12 and 14 in some areas to occupy the space available between the panels 12 and 14. The function of such blocks (known as crash pads) is to transmit toward the inside of the vehicle any inward deformation of the door resulting from a collision, the effect of which is to push inward a person seated alongside the door to keep that person safe from sharp or otherwise hazardous parts of the sheet metal of the door. Thus, the expanded synthetic plastic material blocks are safety members integrated into the doors. If any of them is in line with the bead 22 of adhesive material, the invention uses them to press the bead 22 onto the support plate 10 and the bearing frame 24 is interrupted at the location of the block concerned.

The sealing and acoustic insulation panel in accordance with the invention is fixed to a door inner skin 10 in the following manner:

The bearing frame 24 is placed on the panel 14, after which the panel 12 is offered up and fixed temporarily to the panel 14 by means of the pins 26, that pass through corresponding orifices in the panel 12. The panels 12 and 14 then constitute a sub-assembly which is shipped in this form to an automobile manufacturer. To fix the sub-assembly to the plate 10, the manufacturer removes the protective paper over the bead 22 of adhesive material and then fixes the sub-assembly 12, 14 to the plate 10 by forcing the pins 26 into holes provided for this purpose in the plate 10. Because of the presence of the frame 24, clipping the panel 14 to the plate 10 applies pressure to the bead 22 of adhesive material on the plate 10, in a manner that is substantially continuous along the bead 22 and achieves good gluing of the panel 12 to the plate 10.

In the FIG. 2 embodiment, the frame 24 has on the same side as the panel 12 elastically compressible means, for example an elastomer or similar material tube 30, which is welded along the frame 24 and bears on the insulation layer 18 of the panel 12. The tube 30 absorbs dimensional tolerances and develops a practically constant bearing force on the bead 22 of adhesive via the panel 12. Compression of the insulation layer 18 also contributes to absorbing dimensional tolerances and applying a relatively constant pressure to the bead 22 of adhesive.

Alternatively, the frame 24 can have a configuration in cross section which confers on it some elasticity or compressibility between the panels 12, 14.

What I claim is:

1. A door trim panel assembly adapted for attachment with an inner portion (10) of an automobile door, comprising:
   (a) a sealing and acoustic insulation panel (12), including:
      (1) a sealing sheet (16) formed of synthetic plastic material, said sheet having first and second faces;
      (2) a bead (22) of adhesive material arranged on said sealing sheet first face for attaching said sealing sheet to the automobile door inner portion; and
      (3) a layer (18) of acoustic insulation material arranged on the second face of said sealing sheet, said acoustic insulation material extending over at least the area of said second face opposite said bead; and
   (b) a door trim panel (14) covering said sealing and insulating panel;
   (c) fastening means (26, 28) for attaching said door trim panel (14) to the inner portion of the automobile door; and
   (d) a bearing frame (24) arranged between said sealing and acoustic insulation panel and said door trim panel, said bearing frame being formed of a semirigid synthetic plastic material and extending opposite said bead, said adhesive bead being pressed into engagement with the inner portion automobile door by said bearing frame when said door trim panel is attached to the automobile door.

2. The panel claimed in claim 1, wherein said bearing frame is made from an expanded synthetic plastic material.

3. The panel claimed in claim 1, wherein said bearing frame is made from expanded polypropylene.

4. The panel claimed in claim 1, wherein said bearing frame is made from expanded polypropylene balls and is shaped by molding.

5. The panel claimed in claim 1, wherein said sealing sheet is thermoformed.

6. The panel claimed in claim 1, wherein said bearing frame forms a substantially continuous spacer between said sealing and acoustic insulation panel and said door trim panel.

7. The panel claimed in claim 1, wherein said sealing and acoustic insulation panel, said bearing frame, and said door trim panel comprise a sub-assembly which is mounted on said door inner portion in a single operation.

8. The panel claimed in claim 7, wherein said fastening means is operable to connect temporarily said door trim panel to said sealing and acoustic insulation panel prior to the adhesive connection of said sealing and acoustic insulation panel to the door inner portion.

9. The panel claimed in claim 1, and further including resilient compressible means (30) arranged between said bearing frame and said sealing and acoustic insulation panel.

10. The panel defined in claim 1, wherein said sealing sheet (16) comprises a polyolefin foam material having a thickness from about 1 millimeter to 3 millimeters; and further wherein said acoustic insulation layer (18) comprises a wadding formed of fine tangled fibers having a diameter on the order of 10 μm or less, said acoustic insulation layer having a thickness from about 8 millimeter to about 30 millimeters.

\* \* \* \* \*